United States Patent
Lee et al.

(10) Patent No.: US 9,380,463 B2
(45) Date of Patent: Jun. 28, 2016

(54) METHOD FOR DISPLAYING LOCK SCREEN AND ELECTRONIC DEVICE THEREOF

(71) Applicant: Samsung Electronics Co., Ltd., Gyeonggi-do (KR)

(72) Inventors: Do-Hyung Lee, Gyeonggi-do (KR); Han-Kil Yoon, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/496,635

(22) Filed: Sep. 25, 2014

(65) Prior Publication Data

US 2015/0126155 A1     May 7, 2015

(30) Foreign Application Priority Data

Nov. 1, 2013   (KR) .................. 10-2013-0132521

(51) Int. Cl.
*H04W 12/08*     (2009.01)
*G06F 3/0484*    (2013.01)
*G06F 21/36*     (2013.01)

(52) U.S. Cl.
CPC ........... *H04W 12/08* (2013.01); *G06F 3/04847* (2013.01); *G06F 21/36* (2013.01)

(58) Field of Classification Search
CPC ...................... H04W 12/06; H04W 12/1208

USPC .................................................. 455/411, 566
See application file for complete search history.

(56) References Cited

U.S. PATENT DOCUMENTS

| | | | | |
|---|---|---|---|---|
| 7,099,699 | B2 * | 8/2006 | Jeong | 455/565 |
| 7,603,143 | B2 * | 10/2009 | Kang et al. | 455/566 |
| 8,761,730 | B2 * | 6/2014 | Tsuda | 455/411 |
| 2002/0058497 | A1 * | 5/2002 | Jeong | 455/410 |
| 2011/0028186 | A1 * | 2/2011 | Lee et al. | 455/566 |
| 2011/0117970 | A1 * | 5/2011 | Choi | 455/566 |
| 2012/0220264 | A1 * | 8/2012 | Kawabata | 455/411 |
| 2013/0035141 | A1 * | 2/2013 | Murakami et al. | 455/566 |
| 2013/0067376 | A1 | 3/2013 | Kim et al. | |
| 2013/0311294 | A1 * | 11/2013 | Ward et al. | 705/14.64 |

FOREIGN PATENT DOCUMENTS

| | | |
|---|---|---|
| KR | 1020080084319 | 9/2008 |
| KR | 1020100043825 | 4/2010 |

\* cited by examiner

*Primary Examiner* — Christopher M Brandt
(74) *Attorney, Agent, or Firm* — The Farrell Law Firm, P.C.

(57) ABSTRACT

A display method in an electronic device and the electronic device thereof are provided. The display method in the electronic device comprises storing a lock screen message received through a network; and, when time for displaying a lock screen arrives, displaying, as a lock screen, contents within the lock screen message.

20 Claims, 17 Drawing Sheets

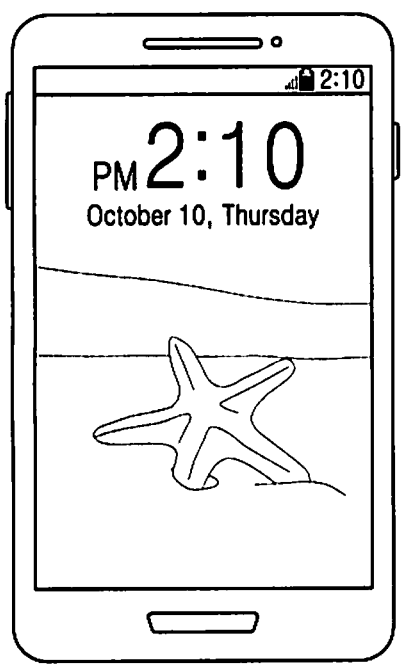
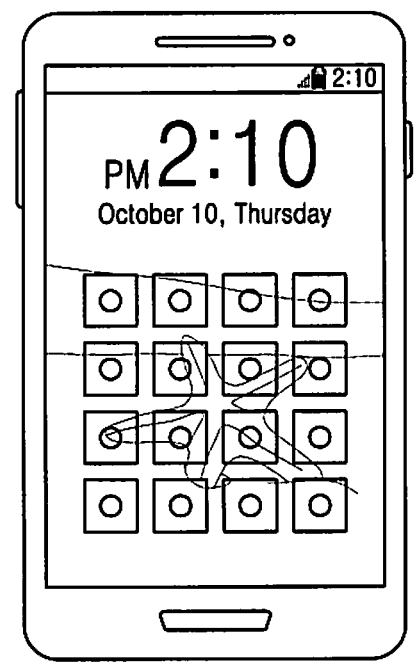
FIG.1A (PRIOR ART)
FIG.1B (PRIOR ART)

Lock Screen with release pattern panel

Home Menu

Lock Screen Message

| | |
|---|---|
| -- | -- |
| Caller | TX_phone number |
| Callee | RX_phone number #1 |
| | RX_phone number #2 |
| | -- |
| Contents | number of contents |
| | contents_type #1 |
| | contents_length #1 |
| | image |
| | contents_type #2 |
| | contents_length #2 |
| | Video |
| | contents_type #3 |
| | contents_length #3 |
| | Text |
| | contents_type #4 |
| | contents_length #4 |
| | audio |
| | -- |
| -- | -- |
| Control Data | display start time |
| | display end time |
| | number of display times |
| | -- |
| -- | -- |

FIG.6

Address Book (or white List)

| Name | Call Number | Additional Info. |
|---|---|---|
| - - | - - | - - |
| jeniffer | 010-1234-5678 | Thumbnail pic. |
| jina | 010-2345-6789 | Thumbnail pic. |
| jason | 010-3456-7890 | Thumbnail pic. |
| - - | - - | - - |

FIG.12

Display Off

Shared Multi Lock Screen List

Shared Multi Lock Screen List  Changed Multi Lock Screen List

METHOD FOR DISPLAYING LOCK SCREEN AND ELECTRONIC DEVICE THEREOF

PRIORITY

This application claims priority under 35 U.S.C. §119(a) to a Korean Patent Application filed in the Korean Intellectual Property Office on Nov. 1, 2013 and assigned Serial No. 10-2013-0132521, the contents of which are incorporated herein by reference.

BACKGROUND OF THE DISCLOSURE

1. Field of the Disclosure

The present disclosure generally relates to a method for displaying a lock screen and an electronic device thereof.

2. Description of the Related Art

A display module having a touch screen function is used in an electronic device, such as a smart phone, a tablet Personal Computer (PC), and the like. The display module can display a lock screen for preventing an unwanted operation from being carried out due to a user's unconscious touch error.

The current time and date, a text message, and the like, can be displayed on the lock screen being overlaid on a preset image, for example, as illustrated in FIGS. 1A and 1B. The image can be displayed as a foreground image in the display module. A current communication state, a battery level, and the like, can be displayed by means of an indicator, and the like, in an upper part of the display module.

A release pattern panel can be, for example, displayed on the lock screen being floated on the lock screen as illustrated in FIGS. 1A and 1B, so that only a previously approved user can release the lock screen. The user can, for example, input a preset unique release pattern and release the lock screen as illustrated in FIG. 2. After that, the user can select a variety of menus displayed on a displayed home menu screen, and the like, to execute an operation intended by the user.

SUMMARY OF THE DISCLOSURE

The present disclosure has been made to address at least the above problems and/or disadvantages and to provide at least the advantages described below. Accordingly, an aspect of the present disclosure is to provide a method for displaying a lock screen and an electronic device thereof, in which a transmission electronic device transmits by a lock screen message various types of contents such as an image, a video, a text, and the like, through a network, and, when time for displaying a lock screen arrives, a reception electronic device displays, as the lock screen, the contents within the lock screen message.

According to an aspect of the present disclosure, a display method in an electronic device is provided. The display method includes storing a lock screen message received through a network, and, when time for displaying a lock screen arrives, displaying, as a lock screen, contents within the lock screen message.

According to another aspect of the present disclosure, an electronic device is provided, which includes a display module configured to display a lock screen, and a processor configured to store a lock screen message received through a network, and, when time for displaying a lock screen arrives, to display, as a lock screen, contents within the lock screen message.

According to another aspect of the present disclosure, a computer-readable storage medium storing a program for performing a method is provided. The method includes storing a lock screen message received through a network; and when time for displaying a lock screen arrives, displaying, as the lock screen, contents within the lock screen message.

BRIEF DESCRIPTION OF THE DRAWINGS

The above and other aspects, features and advantages of the present disclosure will become more apparent from the following detailed description when taken in conjunction with the accompanying drawings, in which:

FIGS. 1A and 1B are diagrams illustrating a general lock screen;

FIG. 6 is a diagram illustrating a construction of a lock screen message according to an embodiment of the present disclosure;

FIG. 12 is a diagram illustrating an address book or a white list according to an embodiment of the present disclosure;

DETAILED DESCRIPTION OF EMBODIMENTS OF THE PRESENT DISCLOSURE

Figure 2:
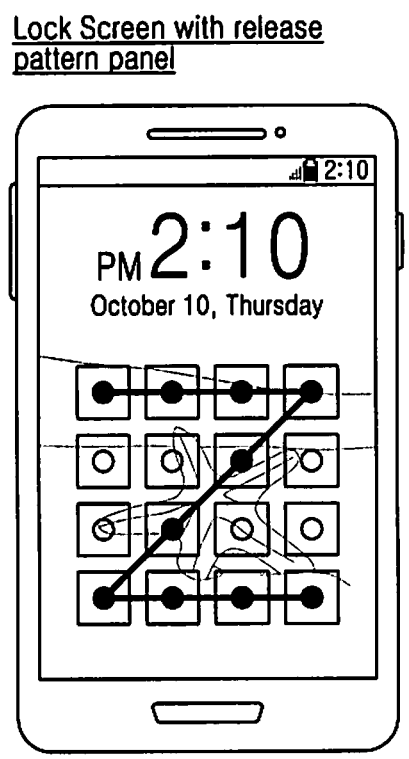
FIG. 2 is a diagram illustrating a process of releasing a general lock screen.
Figure 2:

Various embodiments of the present disclosure are described below with reference to the accompanying drawings. The various embodiments of the present disclosure exemplify specific embodiments in the drawings and state a related detailed description, but can make various modifications and can have several embodiments. Accordingly, it should be understood that the various embodiments of the present disclosure are not intended to be limited to a specific embodiment form, and include all modifications, equivalents, or substitutes included in the spirit and technological scope of the various embodiments of the present disclosure. In relation to a description of the drawing, like reference symbols denote like constituent elements.

In describing the various embodiments of the present disclosure, well-known functions or constructions are not described in detail since they would obscure the disclosure in unnecessary detail. The terms described below, which are defined considering functions in the various embodiments of the present disclosure, can be modified in accordance to a user and operator's intention or practice. Therefore, definitions should be determined on the basis of the content throughout the present specification.

An electronic device according to various embodiments of the present disclosure can be a device including a telecommunication function. For example, the electronic device can be one or a combination of more of various electronic devices, such as a smart phone, a tablet PC, a mobile phone, a video phone, an electronic book (e-book) reader, a desktop PC, a laptop PC, a netbook computer, a Personal Digital Assistant (PDA), a Portable Multimedia Player (PMP), an MPEG Audio Layer 3 (MP3) player, a mobile medical instrument, an electronic bracelet, an electronic necklace, an appcessory, a camera, a wearable device, an electronic clock, a wrist watch, a smart home appliance (e.g., a refrigerator, an air conditioner, a cleaner, an artificial intelligence robot, a TV, a Digital Video Disk (DVD) player, an audio system, an oven, a microwave, a washing machine, an air cleaner, an electronic frame, and the like), various medical instruments (e.g., Magnetic Resonance Angiography (MRA), Magnetic Resonance Imaging (MRI), Computerized Tomography (CT), a moving-camera, an ultrasound machine and the like), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, a car infotainment device, an electronic equipment for ship (for example, a navigation device for ship, a gyrocompass, and the like), avionics, a security instrument, electronic clothes, an electronic locking system, a camcorder, a game console, a Head-Mounted Display (HMD), a flat panel display device, an electronic album, furniture or part of a building/structure including the telecommunication function, an electronic board, an electronic signature receiving device, a projector, and the like. It is apparent to those skilled in the art that the electronic device according to the various embodiments of present disclosure is not limited to the aforementioned devices.

Figure 3:
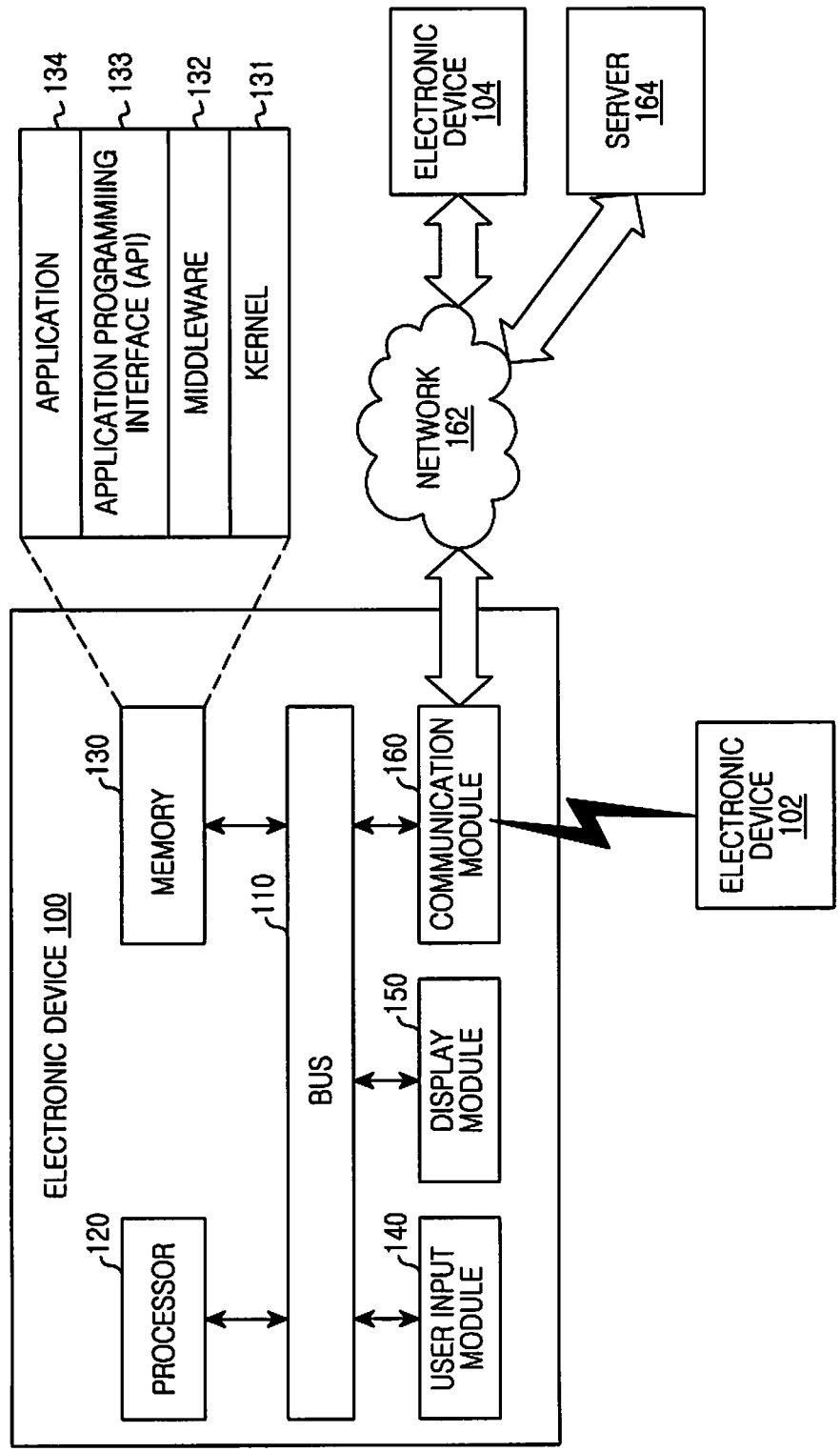
FIG. 3 is a block diagram illustrating a construction of an electronic device according to an embodiment of the present disclosure.

FIG. 3 is a block diagram illustrating a construction of an electronic device according to an embodiment of the present disclosure.

Referring to FIG. 3, the electronic device 100 includes a bus 110, a processor 120, a memory 130, a user input module 140, a display module 150, and a communication module 160. The bus 110 is a circuit connecting the aforementioned constituent elements with one another, and forwarding communication (e.g., control message) among the aforementioned constituent elements. The processor 120, for example, receives instructions from the aforementioned other constituent elements (e.g., the memory 130, the user input module 140, the display module 150, the communication module 160, and the like) through the bus 110, deciphers the received instructions, and executes operations or data processing according to the deciphered instructions.

The memory 130 stores an instruction or data which is received from the processor 120 or the other constituent elements (e.g., the user input module 140, the display module 150, the communication module 160, and the like) or is generated by the processor 120 or the other constituent elements. The memory 130 includes, for example, programming modules such as a kernel 131, a middleware 132, an Application Programming Interface (API) 133, an application 134, and the like. The aforementioned respective programming modules can be comprised of software, firmware, hardware, or a combination of at least two or more of them.

The kernel 131 controls or manages system resources (e.g., the bus 110, the processor 120, the memory 130, and the like) used for executing operations or functions implemented in the remnant other programming modules, for example, the middleware 132, the API 133, and the application 134. The kernel 131 provides an interface capable of accessing and controlling or managing the individual constituent element of the electronic device 100 in the middleware 132, the API 133, or the application 134. The application 134 may be a plurality of applications.

The middleware 132 performs a relay role such that the API 133 or the application 134 can communicate and exchange data with the kernel 131. Regarding work requests received from the plurality of applications 134, the middleware 132 also, for example, performs load balancing for the work requests by a method of allotting at least one application among the plurality of applications 134 in the order of priority of using the system resources (e.g., the bus 110, the processor 120, the memory 130, and the like) of the electronic device 100. The API 133 is an interface enabling the application 134 to control a function provided by the kernel 131 or the middleware 132. The API 133 includes, for example, at least one interface or function for file control, window control, image processing, character control, and the like.

The user input module 140, for example, receives an input of an instruction or data from a user and forwards the instruction or data to the processor 120 or the memory 130 through the bus 110. The display module 150 displays an image, a picture, data, and the like, to the user. The communication module 160 provides communication between the electronic device 100 and other electronic device 102. The communication module 160 supports a certain short-range communication protocol (e.g., Wireless Fidelity (WiFi), Bluetooth (BT), or Near Field Communication (NFC)), and certain network communication 162 (e.g., the Internet, a Local Area Network (LAN), a Wide Area Network (WAN), a telecommunication network, a cellular network, a satellite network, a Plain Old Telephone System (POTS), and the like). The electronic devices 102 and 104 each may be the same device (e.g., the same type of the device) as the electronic device 100, or may be a different device (e.g., a different type of the device).

Figure 4:
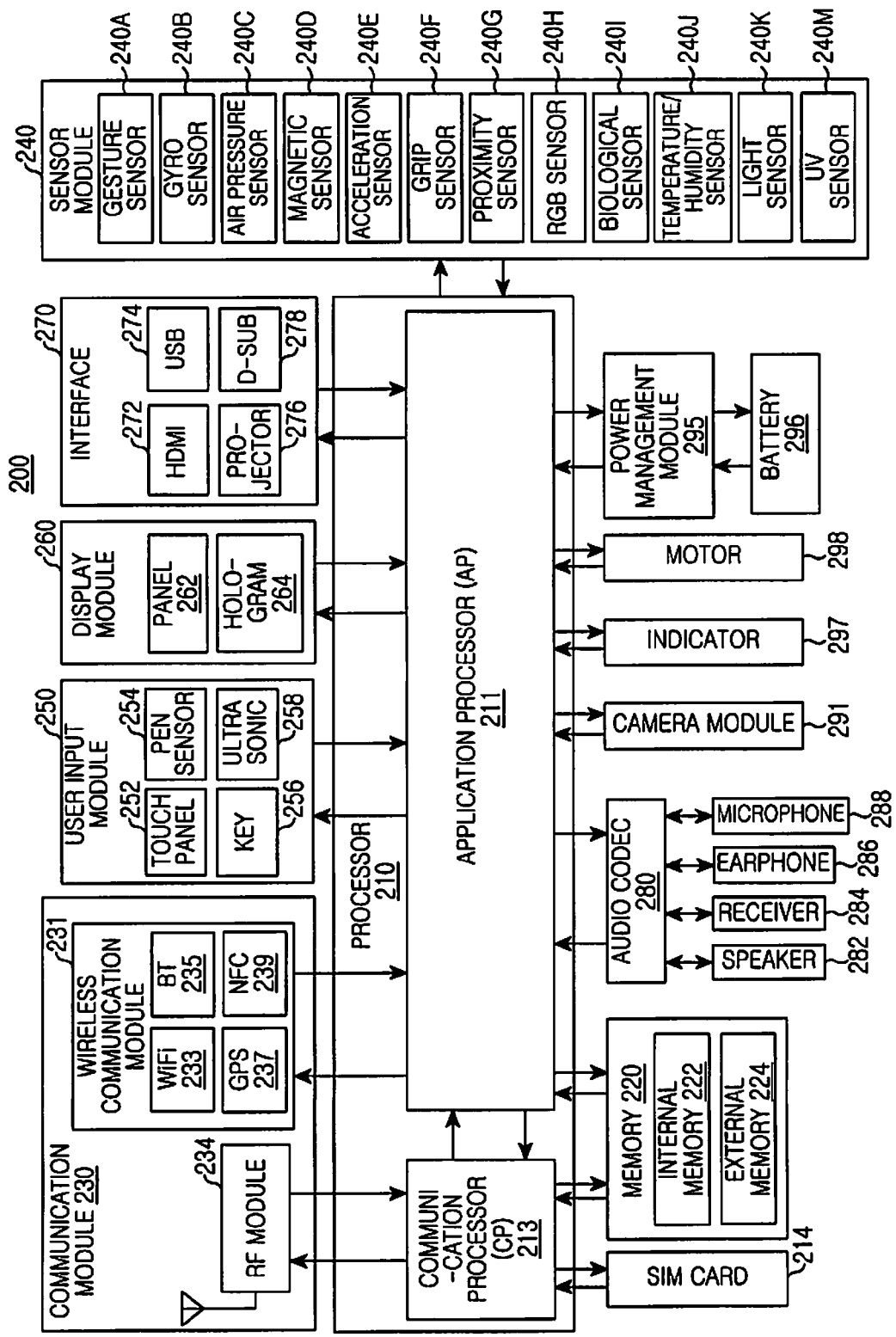
FIG. 4 is a block diagram illustrating a construction of hardware according to an embodiment of the present disclosure.

FIG. 4 is a block diagram illustrating a construction of hardware according to an embodiment of the present disclosure. The hardware 200 may be, for example, the electronic device 100 illustrated in FIG. 3.

Referring to FIG. 4, the hardware 200 includes one or more processors 210, a Subscriber Identification Module (SIM) card 214, a memory 220, a communication module 230, a sensor module 240, a user input module 250, a display module 260, an interface 270, an audio codec 280, a camera module 291, a power management module 295, a battery 296, an indicator 297, and a motor 298.

The processor 210 includes one or more Application Processors (APs) 211 and one or more Communication Processors (CPs) 213. The processor 210 may be, for example, the processor 120 illustrated in FIG. 3. Although FIG. 4 illustrates that the AP 211 and the CP 213 are included within the processor 210, the AP 211 and the CP 213 may be included within different IC packages. Alternatively, the AP 211 and the CP 213 may be included within one IC package.

The AP 211 drives an operating system or an application program, controls a plurality of hardware or software constituent elements connected to the AP 211, and performs operations and processing of various data including multimedia data. The AP 211 may be, for example, implemented as a System on Chip (SoC). The processor 210 may further include a Graphic Processing Unit (GPU).

The CP 213 performs a function of managing a data link and converting a communication protocol in a communication between an electronic device (e.g., the electronic device 100) including the hardware 200 and other electronic devices connected through a network. The CP 213 may be implemented as a SoC, for example. According to an embodiment of the present disclosure, the CP 213 performs at least part of a multimedia control function. The CP 213, for example, performs terminal distinction and authentication within a communication network, using a subscriber identity module (e.g., the SIM card 214). The CP 213 also provides services of voice telephony, video telephony, a text message, packet data, and the like, to a user.

The CP 213 controls data transmission/reception of the communication module 230. Although FIG. 4 illustrates the constituent elements, such as the CP 213, the power management module 295, the memory 220, and the like, as constituent elements separate from the AP 211, the AP 211 may be implemented to include at least some (e.g., the CP 213) of the aforementioned constituent elements. According to one embodiment of the present disclosure, the AP 211 or the CP 213 loads to a volatile memory an instruction or data received from a non-volatile memory connected to each of the AP 211 and the CP 213 or at least one of other constituent elements, and processes the loaded instruction or data. The AP 211 or the CP 213 also stores in the non-volatile memory data received from at least one of the other constituent elements or generated by at least one of the other constituent elements.

The SIM card 214 is a card implementing the subscriber identity module, and can be inserted into a slot provided in a specific location of the electronic device. The SIM card 214 includes unique identification information (e.g., Integrated Circuit Card ID (ICCID)) or subscriber information (e.g., International Mobile Subscriber Identity (IMSI)).

The memory 220 includes an internal memory 222 or an external memory 224. The memory 220 may be, for example, the memory 130 illustrated in FIG. 3. The internal memory 222 includes, for example, at least one of a volatile memory (e.g., a Dynamic Random Access Memory (DRAM), a Static Random Access Memory (SRAM), a Synchronous Dynamic Random Access Memory (SDRAM), and the like) and a non-volatile memory (e.g., a One Time PROM (OTPROM), a Programmable ROM (PROM), an Erasable Programmable ROM (EPROM), an Electrically Erasable Programmable ROM (EEPROM), a mask Read Only Memory (ROM), a flash ROM, a Not AND (NAND) flash memory, a Not OR (NOR) flash memory, and the like). According to an embodiment of the present disclosure, the internal memory 222 takes a form of Solid State Drive (SSD). The external memory 224 may further include, for example, Compact Flash (CF), Secure Digital (SD), Micro Secure Digital (Micro-SD), Mini Secure Digital (Mini-SD), extreme Digital (xD), a memory stick, and the like.

The communication module 230 includes a wireless communication module 231 or a Radio Frequency (RF) module 234. The communication module 230 may be, for example, the communication module 160 illustrated in FIG. 3. The wireless communication module 231 includes, for example, WiFi 233, BT 235, GPS 237, and NFC 239. For example, the wireless communication module 231 provides a wireless communication function using radio frequency. The wireless communication module 231 may further include a network interface (e.g., a LAN card), a modem, and the like, for connecting the hardware 200 with a network (e.g., the Internet, a LAN, a WAN, a telecommunication network, a cellular network, a satellite network, a POTS, and the like).

The RF module 234 takes charge of transmission/reception of data, for example, transmission/reception of an RF signal or a called electric signal. The RF module 234 includes, though not illustrated, for example, a transceiver, a Power Amp Module (PAM), a frequency filter, a Low Noise Amplifier (LNA), and the like. The RF module 234 may further include a component for transmitting/receiving an electromagnetic wave on a free space in wireless communication, for example, a conductor, a conductive line, and the like.

The sensor module 240 includes, for example, at least one of a gesture sensor 240A, a gyro sensor 240B, an air pressure sensor 240C, a magnetic sensor 240D, an acceleration sensor 240E, a grip sensor 240F, a proximity sensor 240G, a Red Green Blue (RGB) sensor 240H, a biological sensor 240I, a temperature/humidity sensor 240J, a light sensor 240K, and a Ultraviolet (UV) sensor 240M. The sensor module 240 measures a physical quantity or senses an activation state of the electronic device and converts measured or sensed information into an electrical signal. The sensor module 240 may further include, for example, an Electronic nose (E-nose) sensor, an Electromyography (EMG) sensor, an Electroencephalogram (EEG) sensor, an Electrocardiogram (ECG) sensor, a fingerprint sensor, and the like. The sensor module 240 may further include a control circuit for controlling at least one or more sensors provided therein. The sensor module 240 is controlled by the processor 210.

The user input module 250 includes a touch panel 252, a (digital) pen sensor 254, a key 256, and an ultrasonic input device 258. The user input module 250 may be, for example, the user input module 140 illustrated in FIG. 3. The touch panel 252 recognizes, for example, a touch input in at least one of a capacitive method, a pressure sensitive method, an infrared method, and an ultrasonic method. The touch panel 252 may further include a controller. In the capacitive method, recognition of not only direct touch but also proximity is possible. The touch panel 252 may further include a tactile layer. In this case, the touch panel 252 provides a tactile response to a user.

The (digital) pen sensor 254 is implemented, for example, using the same or similar method with receiving a user's touch input or a separate sheet for recognition. The key 256 is, for example, a keypad or a touch key. The ultrasonic input device 258 is a device capable of confirming data by sensing a sound wave with a microphone (e.g., a microphone 288) of the electronic device, and performs wireless recognition through a pen generating an ultrasonic signal. According to an embodiment of the present disclosure, the hardware 200 also receives a user input from an external device (e.g., a network, a computer, or a server) connected to the hardware 200 using the communication module 230.

The display module 260 includes a panel 262 and a hologram 264. The display module 260 may be, for example, the display module 150 illustrated in FIG. 3. The panel 262 is, for example, a Liquid Crystal Display (LCD), an Active-Matrix Organic Light-Emitting Diode (AMOLED), and the like. The panel 262 is implemented to be flexible, transparent, or wearable, for example. The panel 262 may also be constructed as one module together with the touch panel 252. The hologram 264 shows a three-dimensional image in the air by using interference of light. The display module 260 may further include a control circuit for controlling the panel 262 and the hologram 264.

The interface 270 includes, for example, a High-Definition Multimedia Interface (HDMI) 272, a Universal Serial Bus (USB) 274, a projector 276, and a D-subminiature (D-sub) 278. The interface 270 may further include, for example, Secure Digital/Multi Media Card (SD/MMC) or Infrared Data Association (IrDA). The audio codec 280 converts a voice to an electric signal, or vice versa. The audio codec 280 converts, for example, voice information that is inputted or outputted through a speaker 282, a receiver 284, an earphone 286, the microphone 288, and the like.

The camera module 291 is a device capable of taking an image and a video. According to an embodiment of the present disclosure, the camera module 291 includes one or more image sensors (e.g., a front lens or a rear lens), an Image Signal Processor (ISP), or a flash LED. The power management module 295 manages power of the hardware 200. Though not illustrated, the power management module 295 may further include, for example, a Power Management Integrated Circuit (PMIC), a charger Integrated Circuit (IC), and a battery gauge.

The PMIC is mounted, for example, within an integrated circuit or a SoC semiconductor. A charging method can be divided into wired and wireless. The charger IC charges a battery, and prevents the inflow of overvoltage or overcurrent from an electric charger. The charger IC includes a charger IC for at least one of a wired charging method and a wireless charging method. The wireless charging method includes, for example, a magnetic resonance method, a magnetic induction method, an electromagnetic method, and the like. The charger IC is added with supplementary circuits for wireless charging, for example, circuits of a coil loop, a resonance circuit, a rectifier circuit, and the like. The battery gauge measures, for example, a level of the battery 296, a voltage in charging, an electric current, or a temperature.

The battery 296 generates electricity and supplies a power source. The battery 296 may be, for example, a rechargeable battery. The indicator 297 displays a specific state of the hardware 200 or a part (e.g., the AP 211) thereof, such as a booting state, a message state, a charging state, and the like. The motor 298 converts an electrical signal into a mechanical vibration.

Though not illustrated, the hardware 200 may further include a processing device (e.g., a GPU) for mobile TV support. The processing device for mobile TV support processes, for example, standard media data of Digital Multimedia Broadcasting (DMB), Digital Video Broadcasting (DVB), a media flow, and the like.

The names of the aforementioned constituent elements of the hardware 200 according to various embodiments of the present disclosure can be varied according to the type of an electronic device. The hardware 200 according to the various embodiments of the present disclosure may include at least one of the aforementioned constituent elements, and may omit some constituent elements or further include additional other constituent elements. Also, some of the constituent elements of the hardware 200 according to the various embodiments of the present disclosure are coupled and constructed as one entity, thereby being able to identically perform the functions of the corresponding constituent elements before being coupled.

Figure 5:
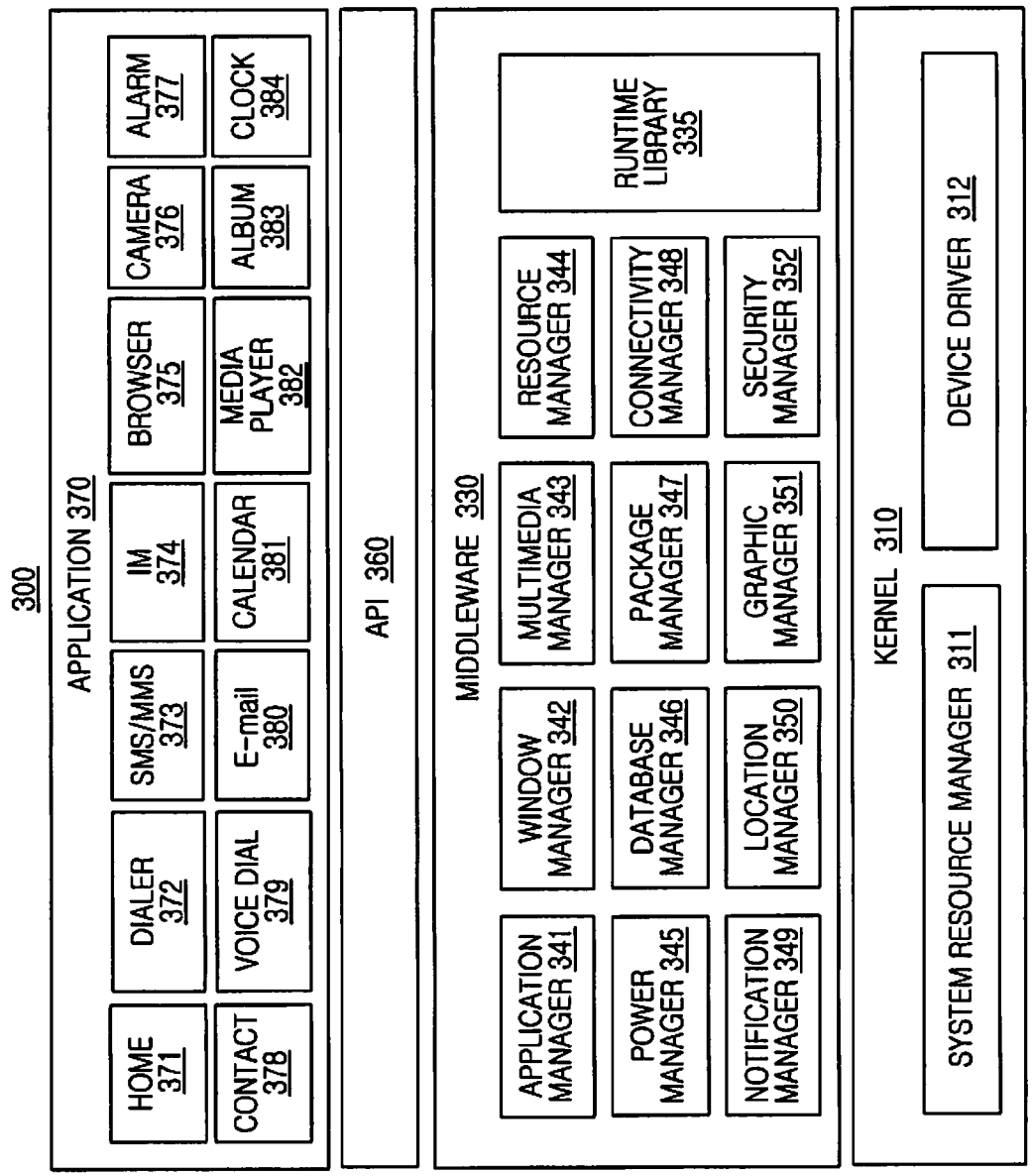
FIG. 5 is a block diagram illustrating a construction of a programming module according to an embodiment of the present disclosure.

FIG. 5 is a block diagram illustrating a construction of a programming module according to an embodiment of the present disclosure.

The programming module 300 may be included (e.g., stored) in the electronic device 100 (e.g., the memory 130 of FIG. 3) illustrated in FIG. 3. At least part of the programming module 300 is constructed by software, firmware, hardware, or a combination of at least two or more of them.

The programming module 300 includes an Operating System (OS) implemented in hardware (e.g., the hardware 200 of FIG. 4) and controlling resources related to the electronic device (e.g., the electronic device 100 of FIG. 3) or various applications (e.g., the application 370) driven on the operating system. For example, the operating system is Android, iPhone OS (iOS), Windows, Symbian, Tizen, Badda, and the like. Referring to FIG. 5, the programming module 300 includes a kernel 310, a middleware 330, an API 360, and an application 370.

The kernel 310 (e.g., the kernel 131 of FIG. 3) includes a system resource manager 311 or a device driver 312. The system resource manager 311 includes, for example, a process management unit, a memory management unit, a file system management unit, and the like. The system resource manager 311 performs control of a system resource, allocation thereof, recovery thereof, and the like. The device driver 312 includes, for example, a display driver, a camera driver, a Bluetooth driver, a shared memory driver, a USB driver, a keypad driver, a WiFi driver, and an audio driver. The device driver 312 may further include an Inter-Process Communication (IPC) driver.

The middleware 330 includes a plurality of modules previously implemented to provide a function commonly required by the application 370. The middleware 330 also provides a function through the API 360 such that the application 370 can make efficient use of a restricted system resource within the electronic device.

As illustrated in FIG. 5, the middleware 330 (e.g., the middleware 132 of FIG. 3) includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 includes, for example, a library module used by a compiler to add a new function through a programming language while the application 370 is executed. According to an embodiment of the present disclosure, the runtime library 335 performs a function of input/output, memory management, arithmetic function, and the like. The application manager 341 manages, for example, a life cycle of at least one application among the applications 370. The window manager 342 manages a GUI resource used in a screen.

The multimedia manager 343 grasps a format necessary for playing various media files, and performs encoding or decoding of a media file using a codec suitable to a corresponding format. The resource manager 344 manages a resource such as a source code of at least any one application among the applications 370, a memory thereof, a storage space thereof, and the like. The power manager 345 operates together with a Basic Input/Output System (BIOS), and the like, to manage a battery or a power source, and provides power information, and the like, necessary for the operation. The database manager 346 manages to create, search or change a database to be used in at least one application among the applications 370.

The package manager 347 manages installation or updating of an application which is distributed in a form of a package file. The connectivity manager 348 manages, for example, wireless connection such as WiFi, Bluetooth, and the like. The notification manager 349 displays or notifies an event such as an arrival message, an appointment, a proximity notification, and the like, in a way not giving a disturbance to a user. The location manager 350 manages location information of the electronic device.

The graphic manager 351 manages a graphic effect to be provided to a user or a user interface related thereto. The security manager 352 provides a general security function necessary for system security, user authentication, and the like. According to an embodiment of the present disclosure, if the electronic device (e.g., the electronic device 100 of FIG. 3) has a phone function, the middleware 330 further includes a telephony manager for managing a voice or video telephony function of the electronic device.

The middleware 330 creates and uses a new middleware module through a combination of various functions of the aforementioned internal constituent element modules. The middleware 330 provides a module specialized by type of an operating system so as to provide a differentiated function. Also, the middleware 330 dynamically deletes some of the existing constituent elements or adds new constituent elements. Accordingly, the middleware 330 may omit some of the constituent elements stated in various embodiments of the present disclosure, further include other constituent elements, or substitute with constituent elements of different names performing similar functions.

The API 360 (e.g., the API 133 of FIG. 3) is a set of API programming functions, and can be provided to have other construction in accordance to an operating system. For example, in a case of Android or iOS, it, for example, provides one API set by platform; and, in a case of Tizen, it, for example, provides two or more API sets. The application 370 (e.g., the application 134 of FIG. 3), for example, includes a preloaded application or a third party application.

At least part of the programming module 300 is implemented by an instruction stored in a computer-readable storage medium. When the instruction is executed by one or more processors (e.g., the processor 210 of FIG. 4), the one or more processors perform a function corresponding to the instruction. The computer-readable storage medium may be, for example, the memory 260 of FIG. 4. At least part of the programming module 300 may be, for example, implemented (e.g., executed) by the processor 210 of FIG. 4.

At least part of the programming module 300, for example, includes a module, a program, a routine, an instruction set, a process, and the like, for performing one or more functions. The names of the constituent elements of the programming module (e.g., the programming module 300) according to various embodiments of the present disclosure can be varied in accordance to the type of an operating system. Also, the programming module according to the various embodiments of the present disclosure may include at least one or more of the aforementioned constituent elements, omit some of the aforementioned constituent elements, or further include additional other constituent elements.

A method for displaying a lock screen in an electronic device and the electronic device thereof according to an embodiment of the present disclosure are described below in detail. The electronic device according to an embodiment of the present disclosure includes the constituent elements illustrated in FIG. 4. The processor 210 of the electronic device controls operations of the display module 260, the application processor 211, and the like, and displays a lock screen. For example, when the display module 260 turns off, if the processor 210 turns on the display module 260 again after the lapse of a preset time, the processor 210 displays the lock screen in order to prevent the execution of an erroneous operation caused by a touch error.

In accordance to a user's request, the processor 210 also controls operations of the application processor 211, and the like, and generates a lock screen message. The processor 210 then transmits the lock screen message to a reception (Rx) electronic device of a counterpart such as a friend, a family, and the like. The lock screen message may be called as any other name.

FIG. 6 is a diagram illustrating a construction of a lock screen message according to an embodiment of the present disclosure. As illustrated in FIG. 6, the lock screen message includes caller information, callee information, contents information, and the like. The lock screen message may further include control data, and the like, for controlling an operation of displaying contents. The caller information includes a phone number (TX_phone number), and the like, allocated to a transmission (TX) electronic device. The callee information includes a phone number (RX_phone number), and the like, allocated to a reception (RX) electronic device. The callee information may further include a different plurality of phone numbers.

The contents information includes various images or videos which are taken by a user or are downloaded through a network. Further, the contents information further includes a text, an audio, and the like, inputted by the user. The contents information also includes various additional information for indicating number of contents, contents type, contents length, and the like.

The control data includes a display start time, a display end time, and the like, for controlling an operation of displaying contents. The display start time indicates the first start time at which contents can be displayed as a lock screen. A user of the transmission electronic device can arbitrarily set and designate the display start time such that corresponding contents are displayed as the lock screen at a desired time. The display end time indicates the final end time at which the contents can be displayed as the lock screen. The user of the transmission electronic device can arbitrarily set and designate the display end time such that the corresponding contents are no longer displayed as the lock screen after the desired time.

The control data further includes information about the number of display times, which are the times that corresponding contents will be displayed as a lock screen. For example, if the number of display times is one, the corresponding contents are displayed as the lock screen only one time. If the number of display times is infinite, the corresponding contents are displayed as the lock screen continuously as long as a user of the reception electronic device does not remove the corresponding contents.

Figure 7:
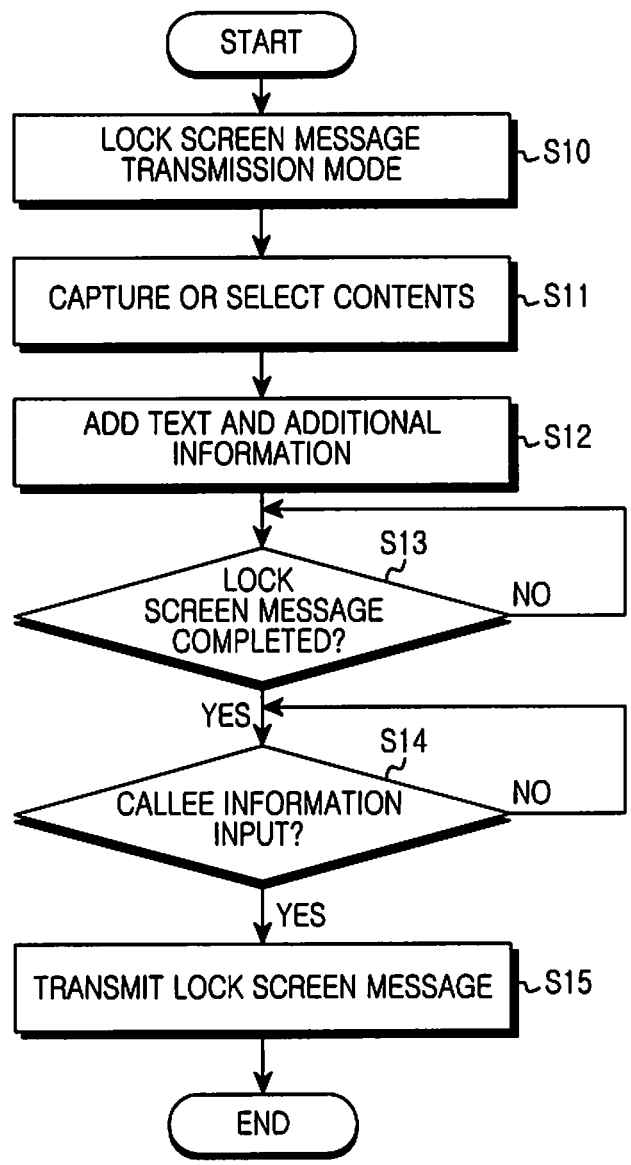
FIG. 7 is a flowchart illustrating an operation of transmitting a lock screen message according to an embodiment of the present disclosure.

FIG. 7 is a flowchart illustrating an operation of transmitting a lock screen message according to an embodiment of the present disclosure. As illustrated in FIG. 7, the processor 210 enters a lock screen message transmission mode in response to a user's request and the like in step S10. The processor 210 captures or selects contents such as an image or a video taken by a user, or contents such as an image or a video downloaded through a network in step S11.

The processor 210 adds arbitrary text and additional information to the contents selected by the user in step S12. For example, a user can input to the contents a text, an audio, and the like, of a message intended to be delivered to a counterpart through a User Interface (UI), and can add to the contents control data about a display start time, a display end time, a display count, and the like, as control data for controlling an operation of displaying the contents.

Meantime, as described above with reference to FIG. 6, the processor 210 automatically generates the number of contents, contents type, contents length information, and the like, as contents information about an image, a video, a text, an audio, and the like, and adds the generated information to the contents, to complete a lock screen message.

If the lock screen message is completed through the aforementioned process in step S13, the processor 210 receives an input of callee information from a user through the user interface. If the user directly inputs a phone number of a desired counterpart as the callee information, or selects an arbitrary phone number stored in an address book, and the like, as the callee information in step S14, the processor 210 transmits the lock screen message to at least one or more counterparts through the network in step S15 after including the inputted or selected phone number in the callee information within the lock screen message.

If the lock screen message is not completed through the aforementioned process in step S13, the procedure repeats step S13. If the callee information is not input (e.g., directly input or selected) in step S14, the procedure repeats step S14.

Figure 8:
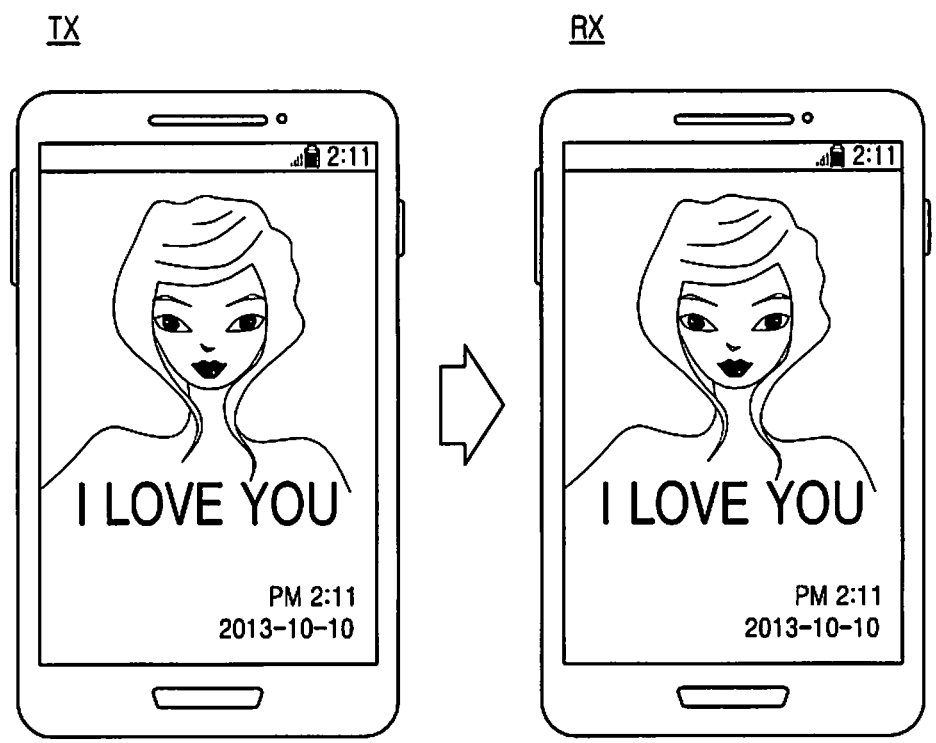
FIG. 8 is a diagram illustrating an example in which a lock screen transmitted by a transmission electronic device is displayed as a lock screen of a reception electronic device in accordance to an embodiment of the present disclosure.

As illustrated in FIG. 8, the reception (Rx) electronic device receives a lock screen transmitted by the transmission (Tx) electronic device and share the lock screen with the transmission (Tx) electronic device. So, when the lock screen is displayed, a user of the reception electronic device can rapidly and easily confirm contents such as an image, a video, and the like, transmitted by the transmission electronic device and send a message intended to be delivered by the transmission electronic device, through the lock screen.

Figure 9:
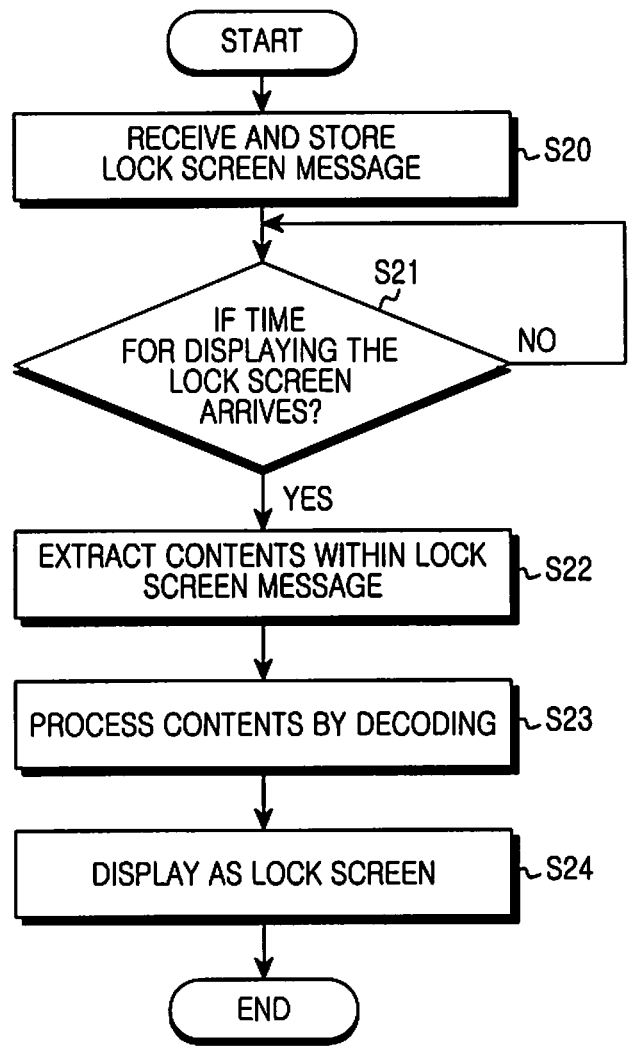
FIG. 9 is a flowchart illustrating an operation of displaying a lock screen in an electronic device according to an embodiment of the present disclosure.

FIG. 9 is a flowchart illustrating an operation of displaying a lock screen in an electronic device according to an embodiment of the present disclosure. As illustrated in FIG. 9, the processor 210 receives and stores a lock screen message received through the communication module 230 in step S20. When the display module 260 turns off, if the processor 210 turns on the display module 260 again after the lapse of a preset time, that is, if time for displaying the lock screen arrives in step S21, the processor 210 extracts contents such as an image, a video, a text, an audio, and the like, included within the lock screen message in step S22. If time for displaying the lock screen does not arrive in step S21, the procedure repeats step S21.

The processor 210 controls an operation of the application processor 210, processes, by decoding, the extracted contents in step S23, and displays the processed contents as the lock screen in step S24. The processor 210 may also previously process, that is, process before time for displaying the lock screen arrives, by extraction and decoding, the contents within the lock screen message and store an image, a video, a text, an audio, and the like, within a memory. When time for displaying the lock screen arrives, the processor 210 outputs as the lock screen the image, the video, the text, the audio, and the like, stored within the memory.

Figure 10:
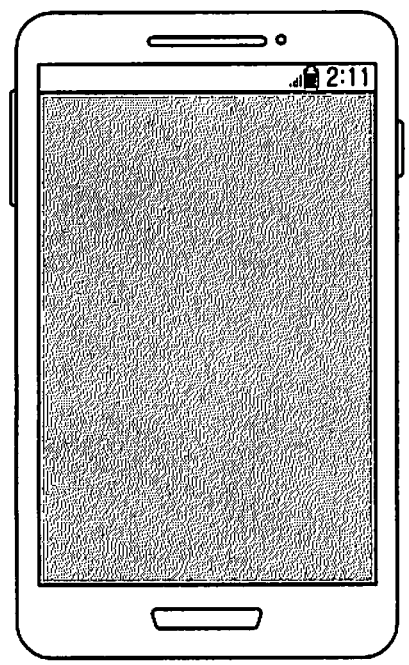
FIG. 10 is a diagram illustrating an example in which a shared lock screen is displayed in accordance to an embodiment of the present disclosure.
Figure 10:

As illustrated in FIG. 10, if the display module 260 is converted from an off state to an on state, that is, time for displaying the lock screen arrives, the display module 260 displays an image, a video, a text, and the like, of a lock screen transmitted by a transmission electronic device. At this time, the shared lock screen #1 displays the time and date when the lock screen message is received, and the like. The lock screen further displays a caller name, and the like, corresponding to a caller's phone number.

Figure 11:
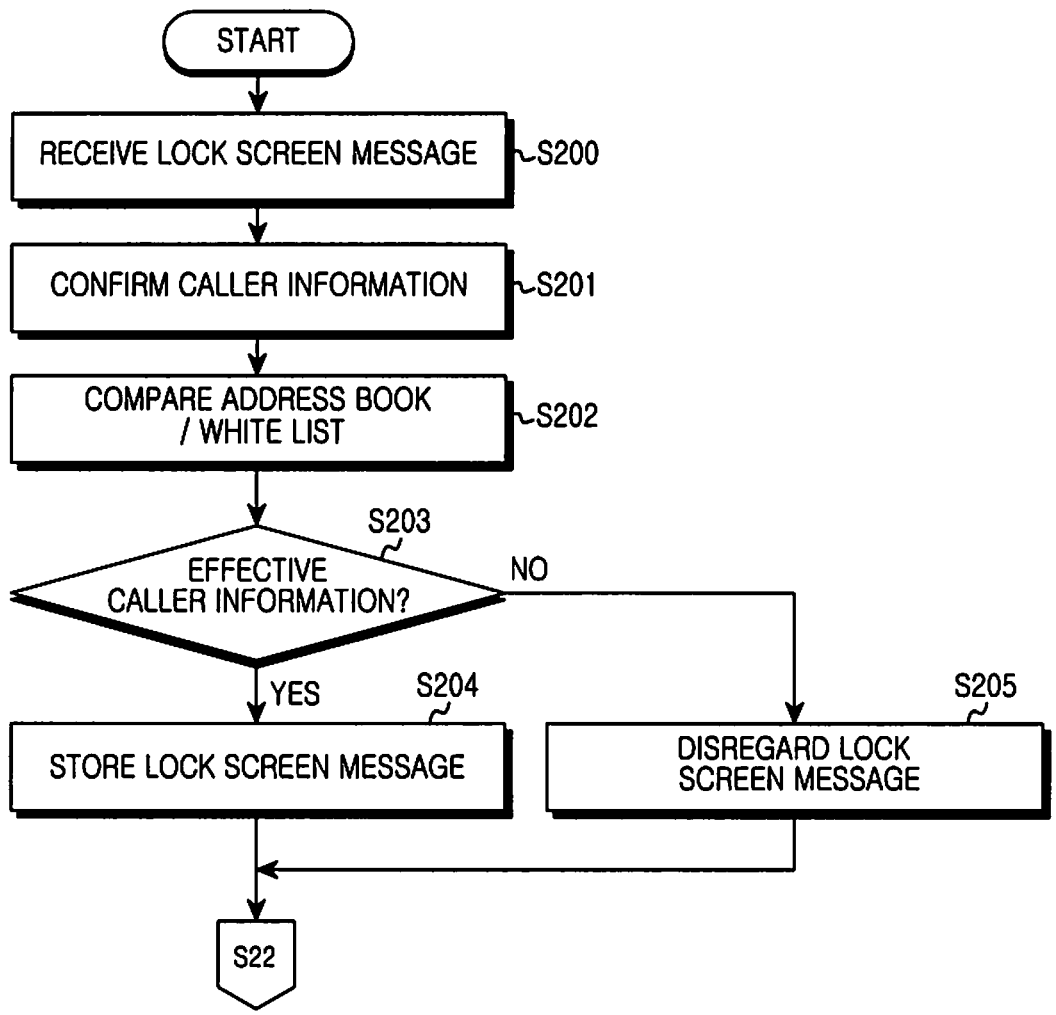
FIG. 11 is a flowchart illustrating an operation of displaying a lock screen in an electronic device according to an embodiment of the present disclosure.

FIG. 11 is a flowchart illustrating an operation of displaying a lock screen in an electronic device according to an embodiment of the present disclosure. For example, if the processor 210 receives a lock screen message through the communication module 230 in step S200, the processor 210 confirms caller information (e.g., a caller ID) included within the lock screen message in step S201.

The processor 210 compares if the confirmed caller information (for example, the caller's phone number) is a phone number included within a preset address book (for example, As illustrated in FIG. 12), or compares if the confirmed caller information is a phone number within a white list (or permitted list of callers) set by a user in step S202, so as to determine the effectiveness of the lock screen message apart from the address book. For example, an address book or a white list is illustrated in FIG. 12.

If the caller information included within the lock screen message is effective caller information included within the address book or white list as the comparison result in step S203, the processor 210 stores the lock screen message in step S204. If the caller information included within the lock screen message is not effective caller information included within the address book or white list as the comparison result in step S203, the processor 210 disregards, without storing, the lock screen message in step S205. The processor 210 can store a lock screen message received from a friend, a family, and the like, and can disregard, without storing, a lock screen message received from a pirate advertisement company, a third party, and the like.

Figure 13:
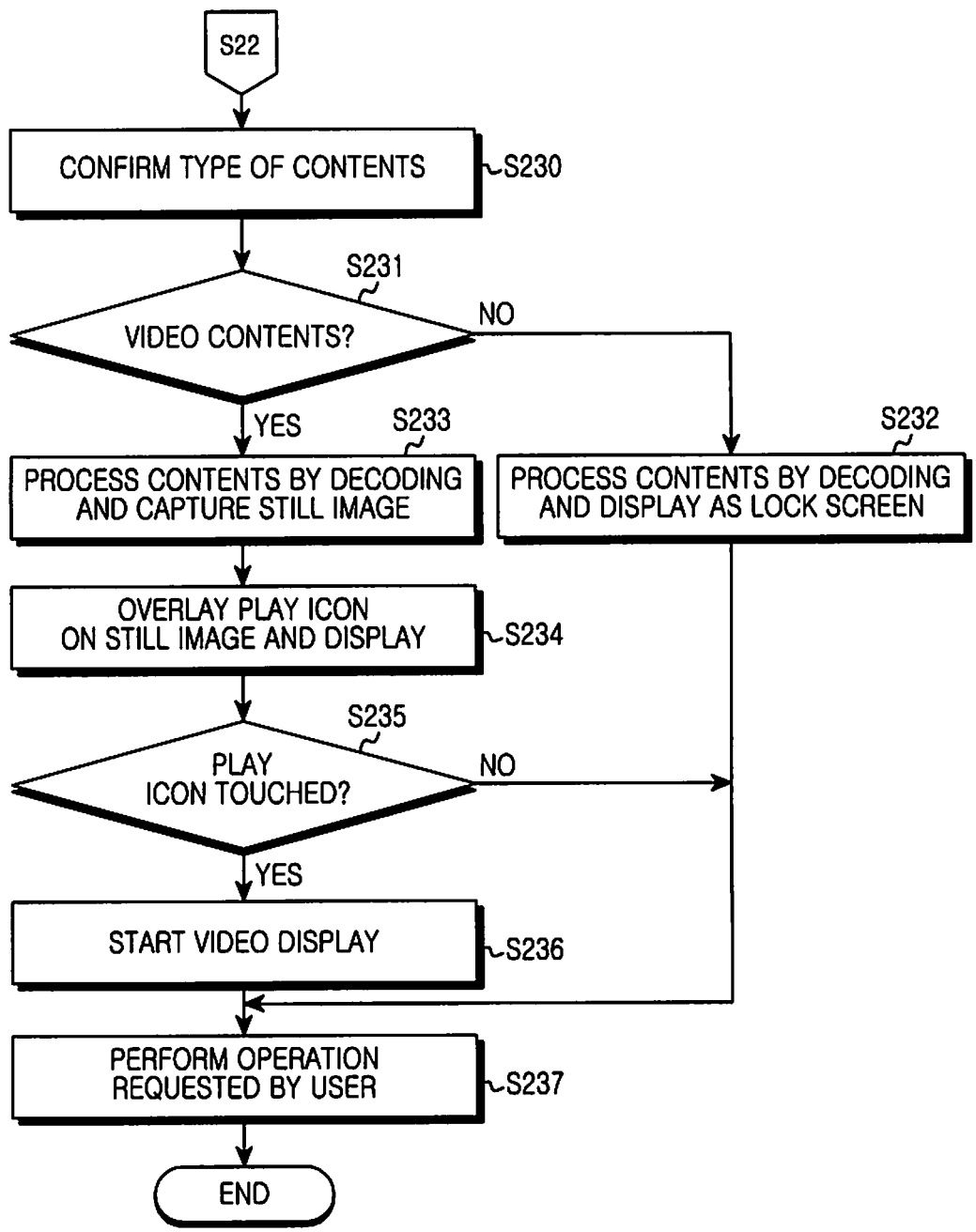
FIG. 13 is a flowchart illustrating an operation of displaying a lock screen in an electronic device according to an embodiment of the present disclosure.

FIG. 13 is a flowchart illustrating an operation of displaying a lock screen in an electronic device according to an embodiment of the present disclosure. As illustrated in FIG. 9, if time for displaying the lock screen arrives in step S21, the processor 210 extracts contents within a lock screen message in step S22. Referring to FIG. 13, after step S22, the processor 210 confirms the type of the contents in step S230. If the confirmed type of the contents is not a video in step S231, for example, if the confirmed type of the contents is an image such as a photo, and the like, the processor 210 processes, by decoding, the contents of the image into a still image (e.g., Joint Photographic Experts Group (JPEG), and the like) and then displays the still image as a lock screen in step S232. The processor 210 then performs an operation requested by a user in step S237.

If the confirmed type of the contents is a video in step S231, the processor 210 processes, by decoding, the contents of the video into Moving Picture Experts Group (MPEG), and the like, and captures an MPEG intra picture as a still image in step S233. The processor 210 overlays a touchable play icon on the captured still image and displays the overlaying result in step S234.

Figure 14:
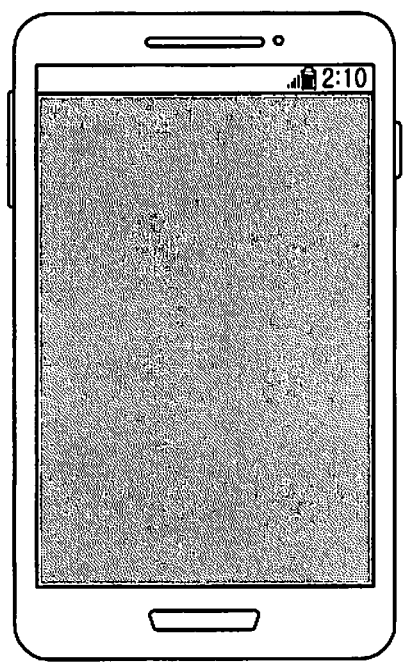
FIG. 14 is a diagram illustrating an example in which a shared video is displayed as a lock screen in accordance to an embodiment of the present disclosure.
Figure 14:

As illustrated in FIG. 14, an icon of a unique shape for playing a video in accordance to a user's touch is displayed with being overlaid on a still image representing a video of a shared lock screen #2. The still image displayed as the lock screen is displayed with a message (e.g., "Hi Papa") of a text intended to be delivered by a counterpart, the time and date when the lock screen message is received, and the like. The still image is further displayed with a caller name, and the like, corresponding to a caller's phone number.

Referring back to FIG. 13, if a user touches the play icon in step S235, the processor 210 starts a video display operation in step S236 and then performs an operation requested by the user in step S237. If a user does not touch the play icon in step S235, the processor 210 performs an operation requested by the user in step S237.

The processor 210 can confirm control data included in the lock screen message, and control an operation of displaying an image, a video, a text, an audio, and the like, as the lock screen. For example, if the current time in an electronic device is out of a period between a display start time and a display end time included in the control data, the processor 210 no longer displays, as the lock screen, the contents within the lock screen message, and the processor 210 returns to a previous lock screen set as a default by a user and displays the previous lock screen.

As mentioned above, the processor 210 can overlay or replace the contents within the lock screen message with an image of the previous lock screen set as the default by the user, and display the image as a foreground image in an uppermost layer. If the lock screen message received and stored is in plural, the processor 210 concurrently displays, as multi screens of various forms, a plurality of contents read out within the respective lock screen messages. For example, if the number of images of the contents to be concurrently displayed as the multi screens is M (e.g., M=2), the processor 210 reduces the respective images to the same size and displays the reduced images on one lock screen.

Figure 15:
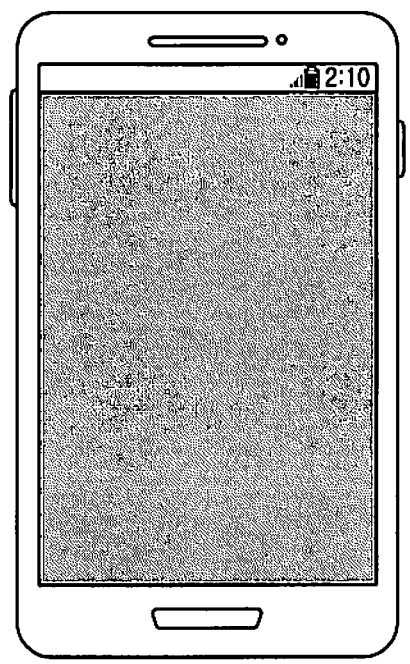
FIG. 15 is a diagram illustrating an example in which a shared video and a shared image are displayed as a lock screen in accordance to an embodiment of the present disclosure.
Figure 15:
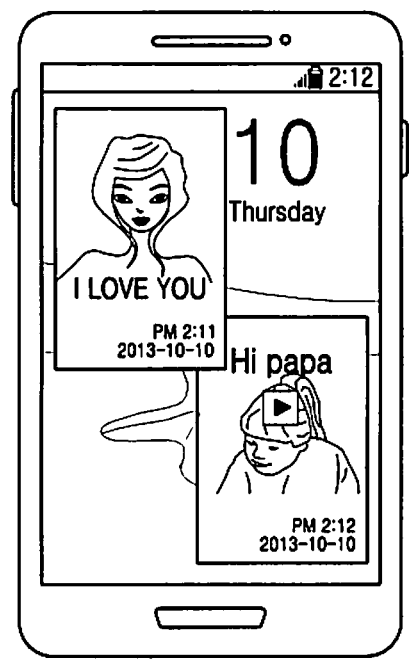

If the number of images of the contents to be concurrently displayed as the multi screens is N (e.g., N>=4), the processor 210 decides any one of the images as a main image and decides the remnant images as sub images, and displays the main image relatively larger than the sub images. As illustrated in FIG. 15, an image of a $1^{st}$ lock screen message and a still image representing a video of a $2^{nd}$ lock screen message are reduced and overlaid on the image of the previous lock screen set as the default by the user.

Figure 16:
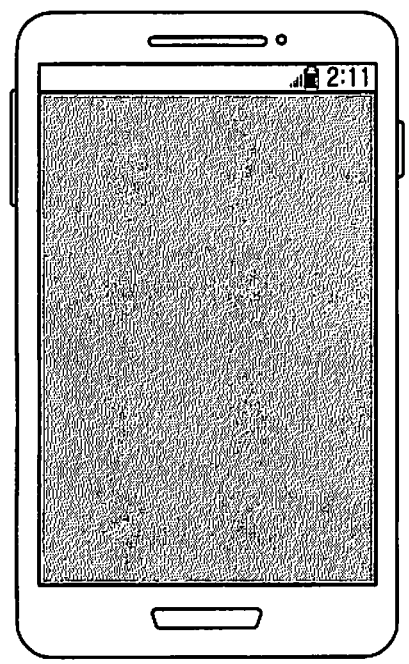
FIG. 16 is a diagram illustrating an example in which a shared image and a plurality of shared videos are displayed as a lock screen list or a lock screen in accordance to an embodiment of the present disclosure.
Figure 16:
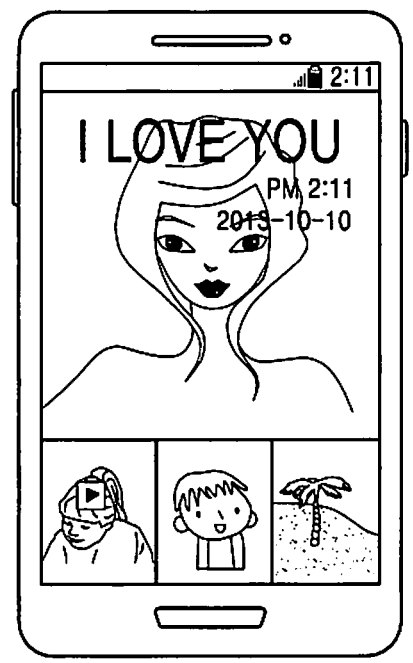

When reducing the plurality of contents and displaying the reduced contents as the multi screens, the processor 210 edits any one or more of a size of a text included within each content and a display location of the text, such that the text, and the like, so that they can be normally displayed within each of the reduced images. As illustrated in FIG. 16, when the number of the lock screen message is four or more, the processor 210 displays, as a main image, a $1^{st}$ image whose reception time is fastest, and reduces the remnant other images to thumbnail images (that is, images in a size of a thumbnail), and displays the thumbnail images in a screen comprising multi screens or a screen list including multi screens.

Figure 17:
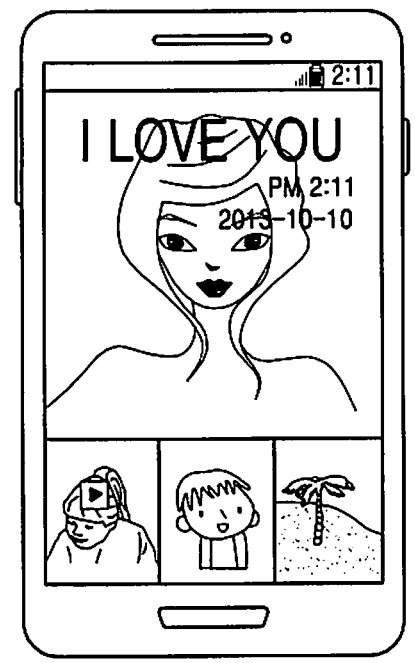
FIG. 17 is a diagram illustrating an example in which a lock screen list or a lock screen is changed in accordance to an embodiment of the present disclosure.
Figure 17:

The thumbnail images are movable by a user's touch. As illustrated in FIG. 17, if a user selects any one of the thumbnail images, the $1^{st}$ image displayed as the main image is reduced and displayed as a thumbnail image, and the selected thumbnail image is expanded and displayed as a main image. The user can confirm the plurality of images extracted within the respective lock screen messages through a screen, a screen list, and the like.

At least a part of an operation and function performed in the processor 210 may be performed, for example, in a server 164 over a network described above with reference to FIG. 3. For example, the operation of creating the lock screen message in the transmission electronic device may be performed in the server 164 instead. Further, the operation of determining the effectiveness of the lock screen message, the operation of editing into the multi screen or the multi screen list, and the like, in the reception electronic device may also be performed in the server 164 instead.

According to various embodiments of the present disclosure, an electronic device can change a lock screen, which is used for preventing the occurrence of an erroneous operation caused by a touch error, and the like, into various contents such as an image, a video, a text, and the like, transmitted by a friend, a family, and the like, through a network and display the various contents. Thus, an electronic device can share the various contents through the lock screen and also quickly and easily confirm a message of a counterpart even when the lock screen is displayed.

Methods according to embodiments stated in claims and/or specification of various embodiments of the present disclosure can be implemented in a form of hardware, software, or a combination of hardware and software. When the methods are implemented by the software, a computer-readable storage medium storing one or more programs (i.e., software modules) can be provided. The one or more programs stored in the computer-readable storage medium are configured to be executed by one or more processors within an electronic device.

The one or more programs can include instructions for enabling the electronic device to execute the methods according to the various embodiments stated in the claims and/or specification of the various embodiments of the present disclosure. These programs (i.e., software modules or software) can be stored in a Random Access Memory (RAM), a non-volatile memory including a flash memory, a ROM, an EEPROM, a magnetic disk storage device, a Compact Disk ROM (CD-ROM), a Digital Video Disk (DVD) or an optical storage device of other form, and a magnetic cassette.

Alternately, the programs can be stored in a memory constructed by a combination of some or all of them. Also, each constructed memory may be included in plural. The programs can be stored in an attachable storage device accessible through a communication network such as the Internet, an intranet, a LAN, a Wireless LAN (WLAN) and a Storage Area Network (SAN), or a communication network constructed by a combination of them. This storage device can access a device through an external port. Also, a separate storage device on the communication network may access a device performing an embodiment of the present disclosure.

In the aforementioned embodiments of the present disclosure, constituent elements of the disclosure have been expressed in the singular number or the plural number in accordance to the proposed embodiments. But, the expression of the singular number or plural number is merely selected suitable to a proposed situation for description's convenience. Various embodiments of the present disclosure are not limited to singular or plural constituent elements. Even the constituent element expressed in the plural number can be constructed in the singular number, or even the constituent element expressed in the singular number can be constructed in the plural number.

While various embodiments of the present disclosure have been shown and described in detail, it is undoubted that various changes in form and details may be made therein without departing from the scope of the various embodiments of the present disclosure. Therefore, the scope of the various embodiments of the present disclosure should not be limited and defined by the described embodiments and should be defined by not only the appended claims but also equivalents to the appended claims.

What is claimed is:

1. A display method in an electronic device, the display method comprising:
receiving a lock screen message through a network, wherein the lock screen message comprises caller information and contents;

storing the lock screen message when the caller information is consistent with preset effective caller information; and displaying the contents from the stored lock screen message as the lock screen, wherein the contents comprise at least one of an image, a video, and text.

2. The display method of claim 1, wherein the contents further comprise an audio.

3. The display method of claim 1, wherein the lock screen message further comprises callee information.

4. The display method of claim 1, wherein the lock screen message further comprises control data for controlling an operation of displaying the contents.

5. The display method of claim 1, wherein storing the lock screen message comprises;

comparing the caller information with the preset effective caller information.

6. The display method of claim 5, wherein the effective caller information is stored within a preset address book or a white list.

7. The display method of claim 1, wherein displaying the contents from the stored lock screen message comprises overlaying or replacing the contents with a preset lock screen image.

8. The display method of claim 1, wherein, if there are multiple stored lock screen messages, displaying the contents from the stored lock screen message comprises displaying, as multi screens, a plurality of contents within the multiple stored lock screen messages.

9. The display method of claim 8, wherein displaying the plurality of the contents comprises editing at least one of a size of a text comprised within each of the contents and a display location thereof.

10. An electronic device comprising:

a processor configured to receive, through a network, a lock screen message comprising caller information and contents, and store the lock screen message when the caller information is consistent with preset effective caller information; and a display configured to display the contents from the stored lock screen message as the lock screen, wherein the contents comprise at least one of an image, a video, and text.

11. The electronic device of claim 10, wherein the contents further comprise an audio.

12. The electronic device of claim 10, wherein the lock screen message further comprises callee information.

13. The electronic device of claim 10, wherein the lock screen message further comprises control data for controlling an operation of displaying the contents.

14. The electronic device of claim 10, wherein the processor is further configured to compare the caller information with the preset effective caller information.

15. The electronic device of claim 14, wherein the effective caller information is stored within a preset address book or a white list.

16. The electronic device of claim 10, wherein the processor is further configured to overlay or replace the contents with a preset lock screen image.

17. The electronic device of claim 10, wherein, if there are multiple stored lock screen messages, the processor is further configured to display, as multi screens, a plurality of contents within the multiple stored lock screen messages.

18. The electronic device of claim 17, wherein, when displaying the plurality of the contents, the processor is configured to edit at least one of a size of a text comprised within each of the contents and a display location thereof.

19. The electronic device of claim 10, further comprising a communication module configured to access the network, wherein, after generating the lock screen message, the processor is configured to transmit the generated lock screen message to at least one counterpart through the communication module.

20. A non-transitory computer-readable storage medium storing a program for performing a method, the method comprising:

receiving a lock screen message through a network, wherein the lock screen message comprises caller information and contents;

storing the lock screen message, when the caller information is consistent with preset effective caller information; and displaying the contents from the stored lock screen message as the lock screen, wherein the contents comprise at least one of an image, a video, and text.

\* \* \* \* \*